United States Patent [19]

Ohkubo

[11] Patent Number: 4,718,298
[45] Date of Patent: Jan. 12, 1988

[54] HYDRAULIC POWER TRANSMISSION

[75] Inventor: Masahiro Ohkubo, Kadoma, Japan

[73] Assignee: Kabushiki Kaisha Dakin Seisakusho, Neyagawa, Japan

[21] Appl. No.: 668,014

[22] Filed: Nov. 5, 1984

[30] Foreign Application Priority Data

Nov. 8, 1983 [JP] Japan .................................. 58-210567

[51] Int. Cl.[4] .......................... F16H 47/10; F16D 33/10
[52] U.S. Cl. ........................................... 74/688; 74/677;
192/3.25; 192/3.32
[58] Field of Search .................. 74/688, 677, 718, 687;
192/3.23, 3.25, 3.24, 3.32; 60/363

[56] References Cited

U.S. PATENT DOCUMENTS

| | | | |
|---|---|---|---|
| 2,093,498 | 9/1937 | Walti | 192/3.25 |
| 2,704,468 | 5/1955 | Horton et al. | 74/688 |
| 2,851,906 | 9/1958 | DeLorean | 74/688 |
| 2,982,152 | 5/1961 | DeLorean | 74/688 |
| 3,270,587 | 9/1966 | Geray | 74/718 |

Primary Examiner—Leslie Braun
Assistant Examiner—Martin G. Belisario
Attorney, Agent, or Firm—Braford E. Kile

[57] ABSTRACT

The disclosure describes a hydraulic power transmission comprising a torque converter of which a pump impeller is adapted to be connected to an output shaft of an engine; a fluid coupling of the pump impeller is adapted to be connected to the output shaft of the engine; an intermediate shaft is connected to a turbine runner of the torque converter; an output shaft is connected to a turbine runner of the fluid coupling; a one-way clutch connects the intermediate shaft to the output shaft and is operable to transmit the torque only fron the intermediate shaft to the output shaft; and a control mechanism for controlling the fluid coupling to operate only when the rotation speed of the output shaft exceeds a predetermined value.

4 Claims, 5 Drawing Figures

HYDRAULIC POWER TRANSMISSION

BACKGROUND AND SUMMARY OF THE INVENTION

The present invention relates to a hydraulic power transmission suitable to heavy vehicles with diesel engines for construction such as wheel loader, mobile crane, dump truck or the like.

Conventionally, such heavy vehicles have employed only a torque converter as a hydraulic power transmission. The output of the torque converter is connected to a hydraulic speed change gear mechanism including gears for some (usually three or more) speed ranges and a hydraulic clutch for selecting the gears.

However, while the torque converter has a large torque capacity at a low rotation speed ratio of the output to the input, the torque capacity thereof remarkably decreases at high rotation speed ratios, so that the engine torque can not be utilized efficiently, and thus, the rate of fuel consumption deteriorates. In order to avoid problems of the type described above, it has been necessary to increase the size of the torque converter to some extent for increasing the torque capacity.

Further, in said prior vehicles, there is a fear that an engine brake can not sufficiently act on a downward slope of a public road.

Moreover, said mechanism having a plurality of speed ranges has a complicated structure and requires a complicated shifting operation.

OBJECTS AND BRIEF SUMMARY OF THE INVENTION

Objects

Accordingly, it is an object of the invention to provide an improved mechanism, wherein torque capacity is large both at low and high rotation speed ratio ranges, the size is small and the structure as well as the shifting operation are simplified.

Another object of the invention is to improve braking function.

Further objects, features and advantages of the invention will appear more fully from the following description of preferred embodiments of the invention.

Brief Summary

The essence of the invention is to provide a hydraulic power transmission including a torque converter for a low speed ratio range and a fluid coupling for a high speed ratio range. According to the invention, the hydraulic power transmission comprises a torque converter of which a pump impeller is adapted to be connected to an input shaft of an engine; a fluid coupling of which pump impeller is adapted to be connected to the input shaft of the engine; an intermediate shaft is connected to a turbine runner of the torque converter; an output shaft is connected to a turbine runner of the fluid coupling; a one-way clutch connects the intermediate shaft to the output shaft and is operable to transmit the torque only from the intermediate shaft to the output shaft; and a control mechanism for controlling the fluid coupling to operate only when the rotation speed of the output shaft exceeds a predetermined value.

DETAILED DESCRIPTION OF THE PREFERRED EMBODIMENTS

Figure 1:
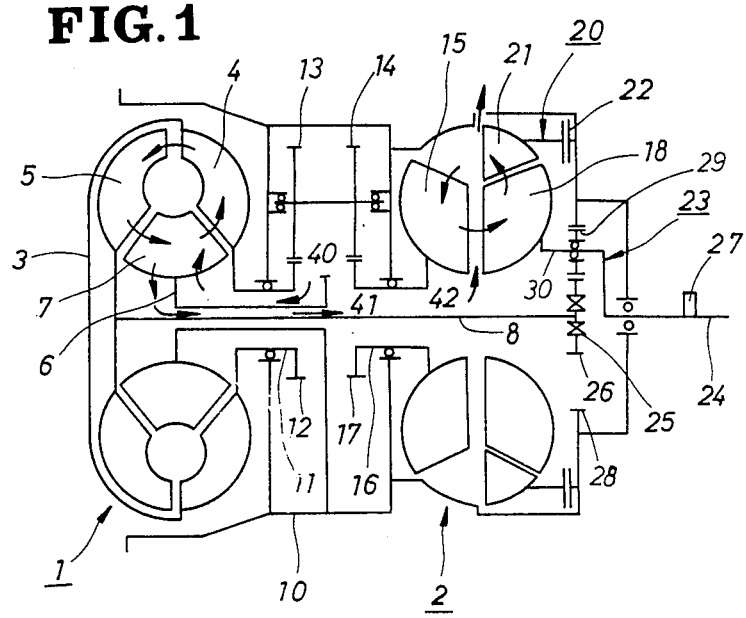
FIG. 1 is a schematic sectional view of a hydraulic power transmission according to the invention.

Referring to FIG. 1, a hydraulic power transmission includes a torque converter 1 and a fluid coupling 2. A cover 3 of the torque converter 1 is connected to an input shaft (not shown) which is an output shaft of a diesel engine of a heavy vehicle. The cover 3 is rigidly provided with a pump impeller 4. A turbine runner 5 and a stator 7 are also disposed in the torque converter 1. The turbine runner 5 is rigidly connected to an intermediate shaft 8 coaxial to said input shaft. The stator 7 is supported through a stationary cylindrical shaft 6 by a housing 10 for both the torque converter 1 and the fluid coupling 2.

The pump impeller 4 is provided with a cylindrical extension 11 having a gear 12 which meshes with a gear 13. The gear 13 is coaxially and rigidly connected to a gear 14 meshing with a gear 17, which is provided at a cylindrical extension 16 of a pump impeller 15 of the fluid coupling 2. The fluid coupling 2 is also provided with a turbine runner 18 and a hydraulic retarder 20. The turbine runner 18 is faced to the pump impeller 15. A braking vane wheel 21 of the retarder 20 is disposed radially outside the turbine runner 18. The hydraulic retarder 20 is also provided with a hydraulic or electromagnetic brake 22 connected to the housing 10.

A numeral 23 indicates an epicyclic gear mechanism including a sun gear 26, a ring gear 28 and planetary pinion gears 29. The ring gear 28 is fixed to the housing 10. The planetary pinion gears 29 are carried by a carrier 30 rigidly connected to the turbine runner 18 and an output shaft 24. The sun gear 26 is connected to an intermediate shaft 8 through a one-way clutch 25, which is designed to transmit a torque only from the intermediate shaft 8 to the epicyclic gear mechanism 23. The output shaft 24 is connected to a speed change mechanism (not shown), which includes gears for a few, e.g., two, speed ranges and a hydraulic clutch means for selecting the ranges. A sensor 27 is provided at the output shaft 24 for detecting the rotation speed thereof.

Figure 3:
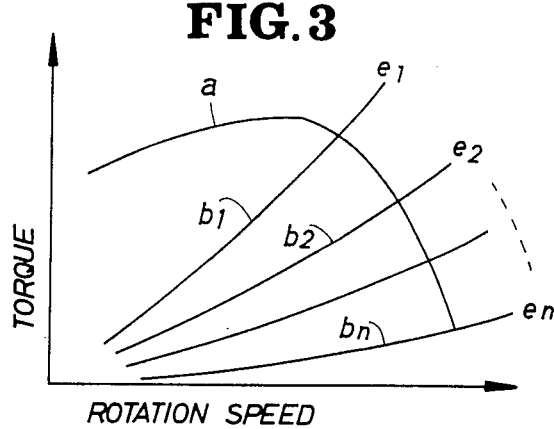
FIGS. 3 and 4 are graphs of characteristics of a torque converter and a fluid coupling, respectively.
Figure 4:
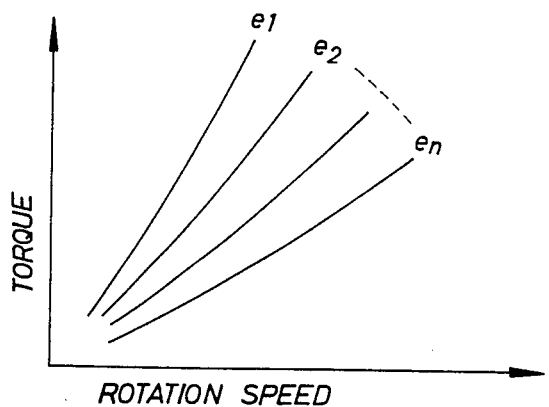

Referring to FIG. 3, a curve a represents a relation between an input rotation speed (engine rotation speed) and an engine torque. Curves b1–bn represent relations between the input rotation speed and the torque at various rotation speed ratios e1–en (e1<e2< ... <en) of the output to the input in the torque converter 1. FIG. 4 represents relations of the input rotation speed and the torque at various rotation speed ratios e1–en (e1<e2< ... <en) of the output to the input in the fluid coupling 2. Generally, as apparent from FIG. 3, the torque converter 1 has a very small torque capacity at the high speed ratio (e.g., ratio en). According to the invention, this part of the low torque capacity is adapted to be compensated by the high torque capacity (FIG. 4) of the fluid coupling 2.

An operation of the mechanism is as follows. Referring to FIG. 1, while the engine is driven, operating oil is supplied into the torque converter 1 through a stationary port 40. The oil circulates in the torque converter 1 as shown by arrows and is discharged to a port 41. In the range of the low speed ratio of the torque converter 1, i.e., during the starting or operating of the vehicle, the torque of the engine is transmitted through the torque converter 1, the intermediate shaft 8, one-way clutch 25 and epicyclic gear mechanism 23 to the output shaft 24, and then transmitted from the shaft 24 to the change speed mechanism. The epicyclic gear mechanism 23 between the shafts 8 and 24 reduces the rotation speed. Although the torque of the engine is also introduced from the pump impeller 4 of the torque converter 1 through the cylindrical extension 11, gears 12, 13, 14 and 17 and the cylindrical extension 16 to the pump impeller 15 of the fluid coupling 2, the torque is not transmitted to the turbine runner 18 of the fluid coupling 2, because the operation oil is not supplied into the fluid coupling 2.

At the range of the high speed ratio, e.g., when the vehicle runs on a public road at a relatively high speed, the rotation speed of the shaft 24 increases. When this output rotation speed exceeds a predetermined value, a valve of a control mechanism (not shown) opens in accordance with the signal from the sensor 27, so that the operation oil is supplied from a port 42 into the fluid coupling 2. Thereafter, the torque of the engine is transmitted from the turbine runner 18 of the fluid coupling 2 to the output shaft 24. The torque converter 1 keeps operating also in the high speed ratio range. However, since the sun gear 26 is rotated by the planetary carrier 30 rigidly connected to the turbine runner 18, the sun gear 26 rotates faster than the intermediate shaft 8 connected to the turbine runner 5 of the torque converter 1. Therefore, the output torque from the torque converter 1 is intercepted by the one-way clutch 25 and is not transmitted to the output shaft 24. If the epicyclic gear mechanism 23 is not employed, the torque capacity of the torque converter 1 is smaller than that of the fluid coupling 2 at the high speed ratio range.

In a usual driving mode at a high speed ratio range, the braking vane wheel 21 of the hydraulic retarder 20 rotates substantially together with the turbine runner 18. When a braking force is applied to the brake 22, the braking vane wheel 21 stops rotating to apply a resistant force through system operation oil to the rotating turbine runner 18. When driving on a public road, speed change is performed by the speed change mechanism.

When the speed ratio decreases in the torque converter 1 and the fluid coupling 2, the control mechanism stops supplying oil into the fluid coupling 2, so that the torque of the engine is transmitted from the torque converter 1 to the output shaft 24.

Figure 5:
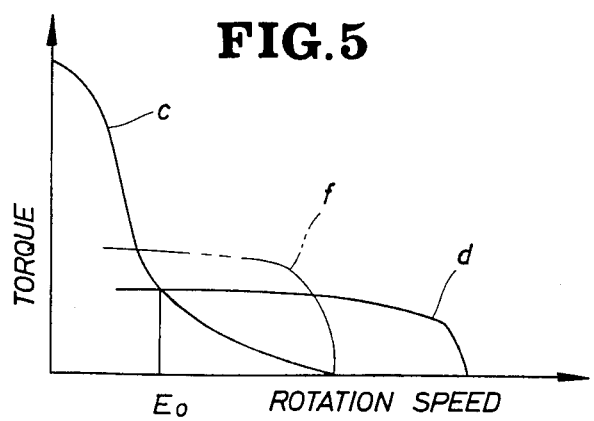
FIG. 5 is a graph representing a relation between output shaft rotational speed and torque transmission.

Referring to FIG. 5, curve c represents a relation between the output rotation speed and the torque transmitted from the torque converter 1 to the output shaft 24. Curve d represents the relation between the output rotation speed and the torque transmitted from the fluid coupling 2 to the output shaft 24. When the output rotation speed is less than a value of Eo, torque is transmitted directly from the torque converter 1. When it exceeds the value of Eo, torque is transmitted from the fluid coupling 2. Curve f indicates a relation between the output rotation speed and torque transmitted from the fluid coupling 2 to the output shaft when the epicyclic gear mechanism does not have a reduction function.

Figure 2:
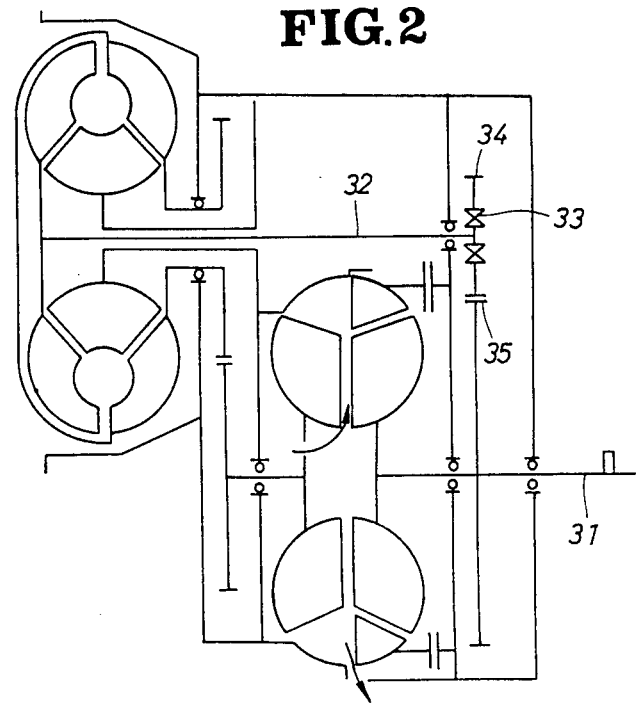
FIG. 2 is a schematic sectional view of a hydraulic power transmission of another embodiment of the invention.

FIG. 2 illustrates another embodiment, in which an output shaft 31 is arranged lower than an intermediate shaft 32 and an input shaft (not shown) coaxial thereto. The intermediate shaft 32 is connected through an one-way clutch 33 and gears 34 and 35 to the output shaft 31. Generally, in a heavy vehicle, since a differential mechanism is disposed lower than the engine, this arrangement is convenient.

In modifications of the invention, instead of the sensor 27, rotation speed sensors may be provided at the input shaft and the intermediate shaft 8, so that a rotation speed ratio between the input and the output in the torque converter 1 may be computed from the values detected by both sensors for controlling an ON-OFF function of the fluid coupling 2. In such case operation oil is supplied into the fluid coupling 2 from an oil pump driven by the engine, a difference between pressures at the inlet (port 40) and the outlet (port 41) of the operation oil as well as an absolute pressure at the inlet may be detected as values corresponding to the rotation speed ratio of the input and output in the torque converter 1, so that ON-OFF of the fluid coupling 2 may be controlled in accordance with those values. Further, such control mechanism may be employed that stops supplying operation oil into the torque converter 1 when the speed ratio range is high and the fluid coupling 2 operates. The epicyclic gear mechanism 23 may not have the reduction function. According to the invention, such a torque converter 1 may be employed that a torque ratio (input torque/output torque) in the stall condition is three or more, so that the input torque capacity of the torque converter in the stall condition may match with a value that is the same as or near the maximum horse power of the engine, and the input torque capacity of the fluid coupling at the speed ratio just when the fluid coupling is selected to start may match with a value that is the same as or near the maximum torque of the engine. According to this constructions, the torque characteristic of the engine can be utilized sufficiently and the tractive force can be improved.

According to the invention, since the high torque capacity can be obtained by the torque converter and the fluid coupling adapted to operate respectively at low and high rotation speed ratio ranges between the input and the output, so that the tractive force can be increased.

Since the low torque capacity at the high speed ratio range of the torque converter can be compensated by the fluid coupling, the torque converter can be small in sizes.

Since the torque capacity at the high speed ratio range is increased, the number of the gears and hydraulic clutches for changing the speed can be reduced, and thus, the operation for changing the speed can be simplified.

When the hydraulic retarder is assembled in the fluid coupling, the space in the fluid coupling can be effectively utilized for the retarder, and the braking force can be increased in the vehicle.

Although the invention has been described in its preferred form with a certain degree of particularity, it is understood that the present disclosure of the preferred form may been changed in the details of construction and the combination and arrangement of parts may be resorted to without departing from the spirit and scope of the invention as hereinafter claimed.

What is claimed is:

1. A hydraulic transmission comprising:
   a torque converter including
       a pump impeller operable to be connected to an output shaft of an engine
       a stator, and a turbine runner;
a fluid coupling, including
 a pump impeller,
 a braking vane wheel, and
 a turbine runner;
an intermediate shaft connected to the turbine runner of said torque converter;
an output shaft operably connected to said turbine runner of said fluid coupling;
one-way clutch means operably connecting said intermediate shaft to said output shaft of the hydraulic transmission and being operable to transmit torque only from the intermediate shaft to the output shaft; and
control means for controlling said fluid coupling to operate only when the rotational speed of the output shaft exceeds a predetermined value wherein at relative low speeds torque is transmitted from said torque converter, said intermediate shaft and said one-way clutch to said output shaft and at relatively high speeds torque is transmitted from said turbine runner of said fluid coupling to said output shaft.

2. A hydraulic transmission as defined in claim 1 and further comprising:
an epicyclic gear mechanism having a sun gear, a ring gear and planetary pinion gears;
said intermediate shaft being connected to said sun gear through said one-way clutch;
said turbine runner of said fluid coupling is connected to said planetary pinion gears of said epicyclic gear mechanism; and
said output shaft is connected to said planetary pinion gears of said epicyclic gear mechanism to provide drive from said torque converter at relatively slow speeds and from said fluid coupling at relatively high speeds.

3. A hydraulic transmission as defined in claims 1 or 2 and further comprising:
a retarder, including a brake, connected to said braking vane of said fluid coupling outside of said fluid coupling for providing braking performance to said output shaft.

4. A hydraulic transmission as defined in claim 1 or 2 and further comprising:
idler gear means positioned between said pump impeller of said torque converter and said impeller of said fluid coupling for determining the relative rotational speed of said fluid coupling with respect to the speed of said torque converter.

* * * * *